(12) United States Patent
Anderson et al.

(10) Patent No.: US 7,809,655 B1
(45) Date of Patent: Oct. 5, 2010

(54) METHOD FOR SCHEDULING AND USAGE OF SATELLITE BANDWIDTH

(75) Inventors: Ken W. Anderson, Louisville, KY (US); Stephen A. Schwager, Louisville, KY (US)

(73) Assignee: Starsat, LLC, Louisville, KY (US)

( * ) Notice: Subject to any disclaimer, the term of this patent is extended or adjusted under 35 U.S.C. 154(b) by 2017 days.

(21) Appl. No.: 10/664,481

(22) Filed: Sep. 17, 2003

(51) Int. Cl.
G06F 15/18 (2006.01)
G06E 1/00 (2006.01)
G06E 3/00 (2006.01)

(52) U.S. Cl. ............................. 706/1; 706/19; 706/20; 706/21

(58) Field of Classification Search ................. 706/1
See application file for complete search history.

(56) References Cited

U.S. PATENT DOCUMENTS

| | | | |
|---|---|---|---|
| 5,581,297 A | 12/1996 | Koz et al. |
| 5,895,453 A | 4/1999 | Cook |
| 6,069,655 A | 5/2000 | Seeley et al. |
| 6,075,560 A | 6/2000 | Katz |
| 6,317,152 B1 | 11/2001 | Hobson et al. |
| 6,323,897 B1 | 11/2001 | Kogane et al. |
| 6,330,025 B1 | 12/2001 | Arazi et al. |
| 6,366,311 B1 | 4/2002 | Monroe |
| 6,385,772 B1 | 5/2002 | Courtney |
| 6,438,696 B1 | 8/2002 | Baran et al. |
| 6,456,335 B1 | 9/2002 | Miura et al. |
| 6,879,808 B1 * | 4/2005 | Nations et al. ............. 455/12.1 |
| 2001/0052933 A1 | 12/2001 | Nybo et al. |
| 2001/0054110 A1 | 12/2001 | Kikinis |
| 2002/0051059 A1 | 5/2002 | Shimizu et al. |
| 2002/0145666 A1 | 10/2002 | Scaman et al. |
| 2003/0012437 A1 * | 1/2003 | Zaklika et al. ............. 382/169 |

OTHER PUBLICATIONS

Batra et al., Effective Algorithms for Video Transmission over Wireless Channels, 1998.*
Vidyakin, Digital Video Via Satellites, 2001.*

* cited by examiner

Primary Examiner—Donald Sparks
Assistant Examiner—Nathan H Brown, Jr.
(74) Attorney, Agent, or Firm—John F. Salazar; Middleton Reutlinger

(57) ABSTRACT

A method for scheduling and usage of satellite bandwidth wherein data is transmitted to an artificial intelligence model for analysis and assigned a ranking. An event resource allocation model analyzes the ranking and determines how to compress the associated video. The event resource allocation model also determines when to compress the remotely stored video and transmit via satellite to a central data center where the video may be reviewed.

49 Claims, 8 Drawing Sheets

TO FIG. 2B

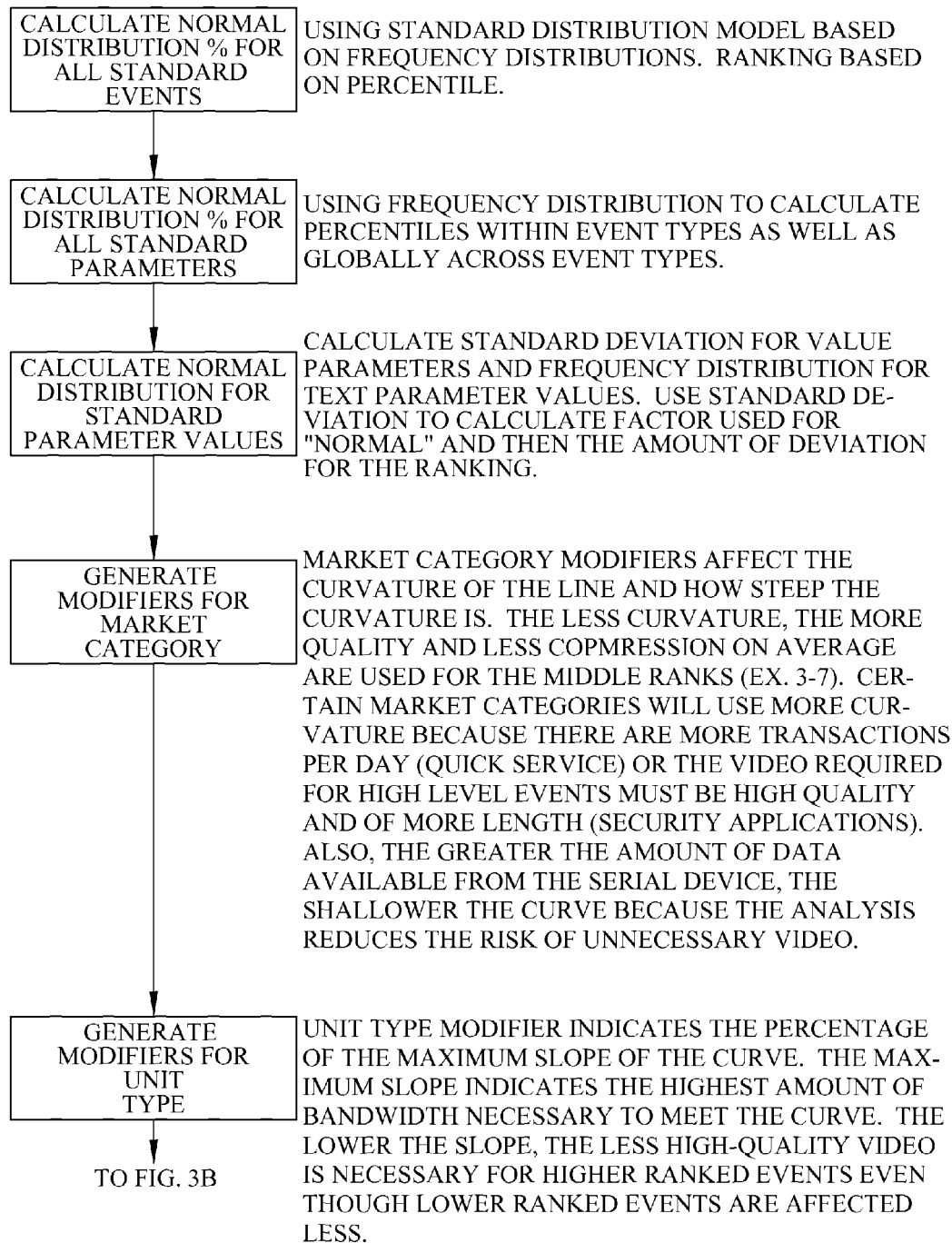

| CALCULATE NORMAL DISTRIBUTION % FOR ALL STANDARD EVENTS | USING STANDARD DISTRIBUTION MODEL BASED ON FREQUENCY DISTRIBUTIONS. RANKING BASED ON PERCENTILE. |
|---|---|
| CALCULATE NORMAL DISTRIBUTION % FOR ALL STANDARD PARAMETERS | USING FREQUENCY DISTRIBUTION TO CALCULATE PERCENTILES WITHIN EVENT TYPES AS WELL AS GLOBALLY ACROSS EVENT TYPES. |
| CALCULATE NORMAL DISTRIBUTION FOR STANDARD PARAMETER VALUES | CALCULATE STANDARD DEVIATION FOR VALUE PARAMETERS AND FREQUENCY DISTRIBUTION FOR TEXT PARAMETER VALUES. USE STANDARD DEVIATION TO CALCULATE FACTOR USED FOR "NORMAL" AND THEN THE AMOUNT OF DEVIATION FOR THE RANKING. |
| GENERATE MODIFIERS FOR MARKET CATEGORY | MARKET CATEGORY MODIFIERS AFFECT THE CURVATURE OF THE LINE AND HOW STEEP THE CURVATURE IS. THE LESS CURVATURE, THE MORE QUALITY AND LESS COPMRESSION ON AVERAGE ARE USED FOR THE MIDDLE RANKS (EX. 3-7). CERTAIN MARKET CATEGORIES WILL USE MORE CURVATURE BECAUSE THERE ARE MORE TRANSACTIONS PER DAY (QUICK SERVICE) OR THE VIDEO REQUIRED FOR HIGH LEVEL EVENTS MUST BE HIGH QUALITY AND OF MORE LENGTH (SECURITY APPLICATIONS). ALSO, THE GREATER THE AMOUNT OF DATA AVAILABLE FROM THE SERIAL DEVICE, THE SHALLOWER THE CURVE BECAUSE THE ANALYSIS REDUCES THE RISK OF UNNECESSARY VIDEO. |
| GENERATE MODIFIERS FOR UNIT TYPE | UNIT TYPE MODIFIER INDICATES THE PERCENTAGE OF THE MAXIMUM SLOPE OF THE CURVE. THE MAXIMUM SLOPE INDICATES THE HIGHEST AMOUNT OF BANDWIDTH NECESSARY TO MEET THE CURVE. THE LOWER THE SLOPE, THE LESS HIGH-QUALITY VIDEO IS NECESSARY FOR HIGHER RANKED EVENTS EVEN THOUGH LOWER RANKED EVENTS ARE AFFECTED LESS. |

| STANDARD | EVENT CRITICALITY | | | | | | | | | | AVERAGE | PROBABLE |
| CONFIGURATION | 0 | 1 | 2 | 3 | 4 | 5 | 6 | 7 | 8 | 9 | BANDWIDTH (Kb) | BANDWIDTH (Kb) |
|---|---|---|---|---|---|---|---|---|---|---|---|---|
| 1 | 15 | 20 | 25 | 30 | 35 | 40 | 45 | 50 | 75 | 100 | 35.7 | 25.8 |
| 2 | 20 | 20 | 25 | 30 | 50 | 50 | 50 | 75 | 100 | 110 | 35.7 | 30.1 |
| 3 | 25 | 30 | 35 | 40 | 60 | 60 | 60 | 85 | 110 | 120 | 35.7 | 38.6 |
| 4 | 30 | 40 | 45 | 50 | 70 | 70 | 70 | 95 | 120 | 130 | 35.7 | 47.1 |

METHOD FOR SCHEDULING AND USAGE OF SATELLITE BANDWIDTH

BACKGROUND OF THE INVENTION

1. Field of the Invention

The present invention relates to a method for scheduling and usage of satellite bandwidth. More specifically, the system relates to capture of digital video and associated digital data and scheduling the usage of satellite bandwidth to upload compressed video segments to a central data center based on event rankings and logic.

2. Description of the Related Art

Many facilities use forms of video monitoring in order to inhibit theft and other crimes which are prevalent in certain industries such as retail sales. However, video monitoring has several drawbacks including the use of cumbersome video tapes which must be labeled, stored, and retrieved for review.

More recently the use of digital video has become available to businesses as costs associated with digital video have decreased due to increased volume of production of digital equipment. In addition to its decreased equipment costs, digital video must be captured and archived to some physical media, such as CD-ROM or DVD-ROM, or transmitted to other sites. However, transfer of digital data has been difficult to accomplish since many communities do not have the infrastructure to provide high-speed or broadband internet access via DSL or cable service. Satellites solve the problem of broadband access to rural locations yet satellite internet access has drawbacks. Satellite internet access typically has fast download speed from the satellite to the user but very slow upload speed from the user to the satellite and is also relatively expensive for high transmission loads. Thus although satellite based internet access solves the problem of broadband internet access to rural locations, a problem still exists for management of limited bandwidth when uploading digital data via satellite.

In view of known deficiencies associated with existing methods satellite based broadband Internet access, a method of managing limited bandwidth in order to upload digital video using satellite based Internet access is needed.

SUMMARY OF THE INVENTION

The present invention provides a method for scheduling and usage of satellite bandwidth.

Another object of the present invention is to provide an artificial intelligence model for tracking and predicting potential behavior wherein the model learns behavior patterns.

Still another object of the present invention is to provide an artificial intelligence model which statistically learns behavior patterns and uses a ranking system for events based on a combination of customer-defined criteria and statistical distribution percentages.

An even further object of the present invention is to provide a method of providing an event resource allocation method to manage the amount of data transmitted from each node dish to the orbiting satellite and then to the receiving station or central data center.

Yet an even further object of the present invention is to provide a method of detecting and monitoring costly behavior patterns and reviewing video of that behavior at a remote location.

Specifically, a method of scheduling and usage of satellite bandwidth includes the steps of continuously deriving an artificial intelligence model for ranking data captured by electronic devices; continuously deriving an event resource allocation model for determining compression routines and managing transmission of compressed video from a remote site to a central data center; capturing said data from an electronic device at a remote site; capturing video associated with said data at said remote site; and, compressing pre-selected video and transmitting the video from a remote site to a central data center.

All of the above outlined objectives are to be understood as exemplary only and many more objectives of the invention may be gleaned from the disclosure herein. Therefore, no limiting interpretations of the objectives noted are to be understood without further reading of the entire specification, claims, and drawings included herewith.

BRIEF DESCRIPTION OF THE DRAWINGS

The aspects and advantages of the present invention will be better understood when the detailed description of the preferred embodiment is taken in conjunction with the accompanying drawings, in which:

FIGS. 3A and 3B depict a flow chart for the artificial intelligence model of the present invention;

DETAILED DESCRIPTION OF THE PREFERRED EMBODIMENT

The present inventive method and system provides for scheduling and usage of satellite bandwidth using an artificial intelligence model and an event resource allocation model allowing management of satellite bandwidth and transmission from a centralized location for digital video analysis. The exemplary system described herein may be used to monitor a single location or node. Alternatively however, it should be understood that a plurality of customer monitoring nodes or sites, for instance in a chain of retail stores, may be monitored using the present method. In addition, it should be understood that multiple customers each having one or more monitoring locations are foreseen using the instant system and method.

Figure 1:
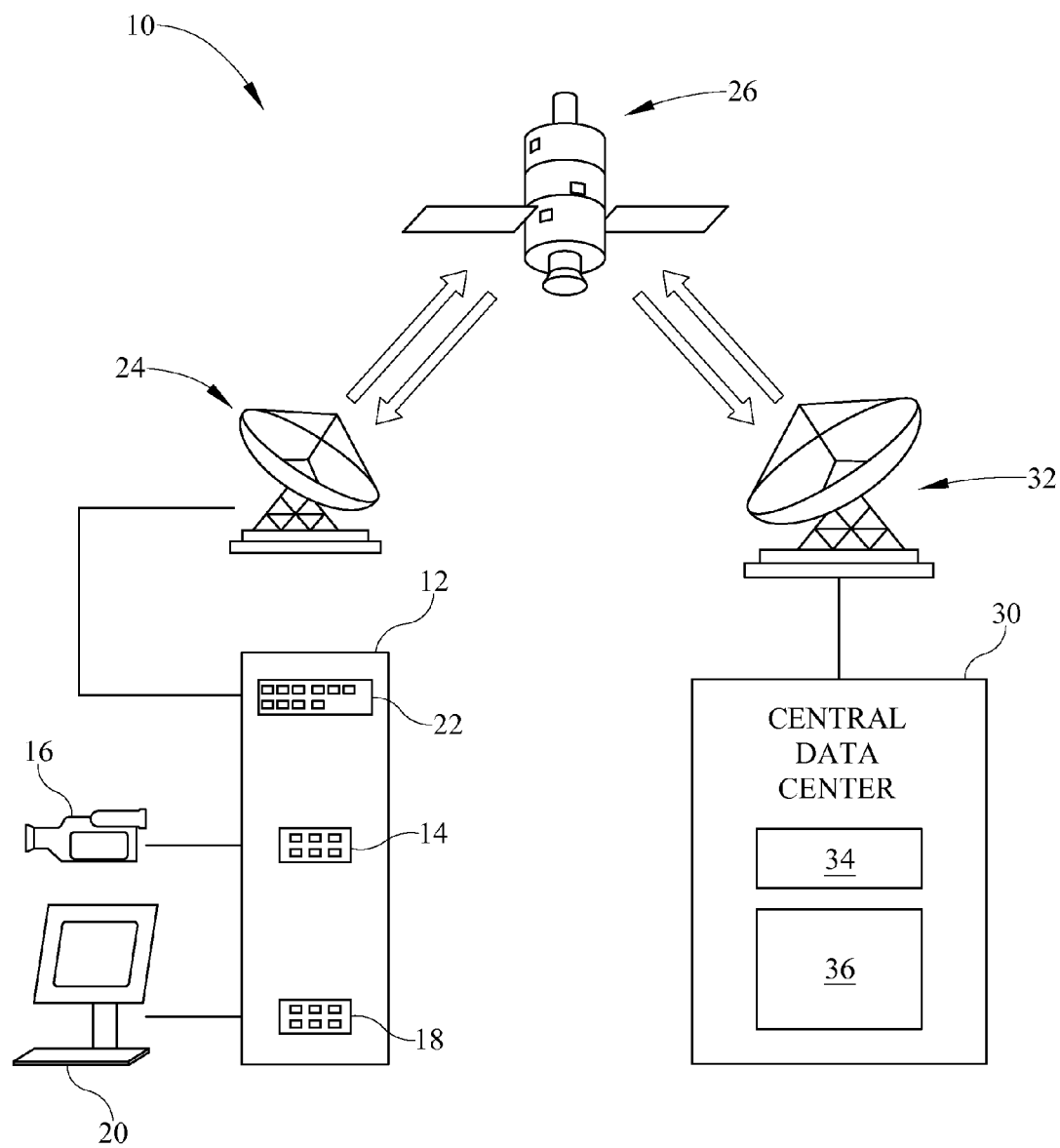
FIG. 1 depicts a schematic view of components associated with the present invention.
Figure 2A:
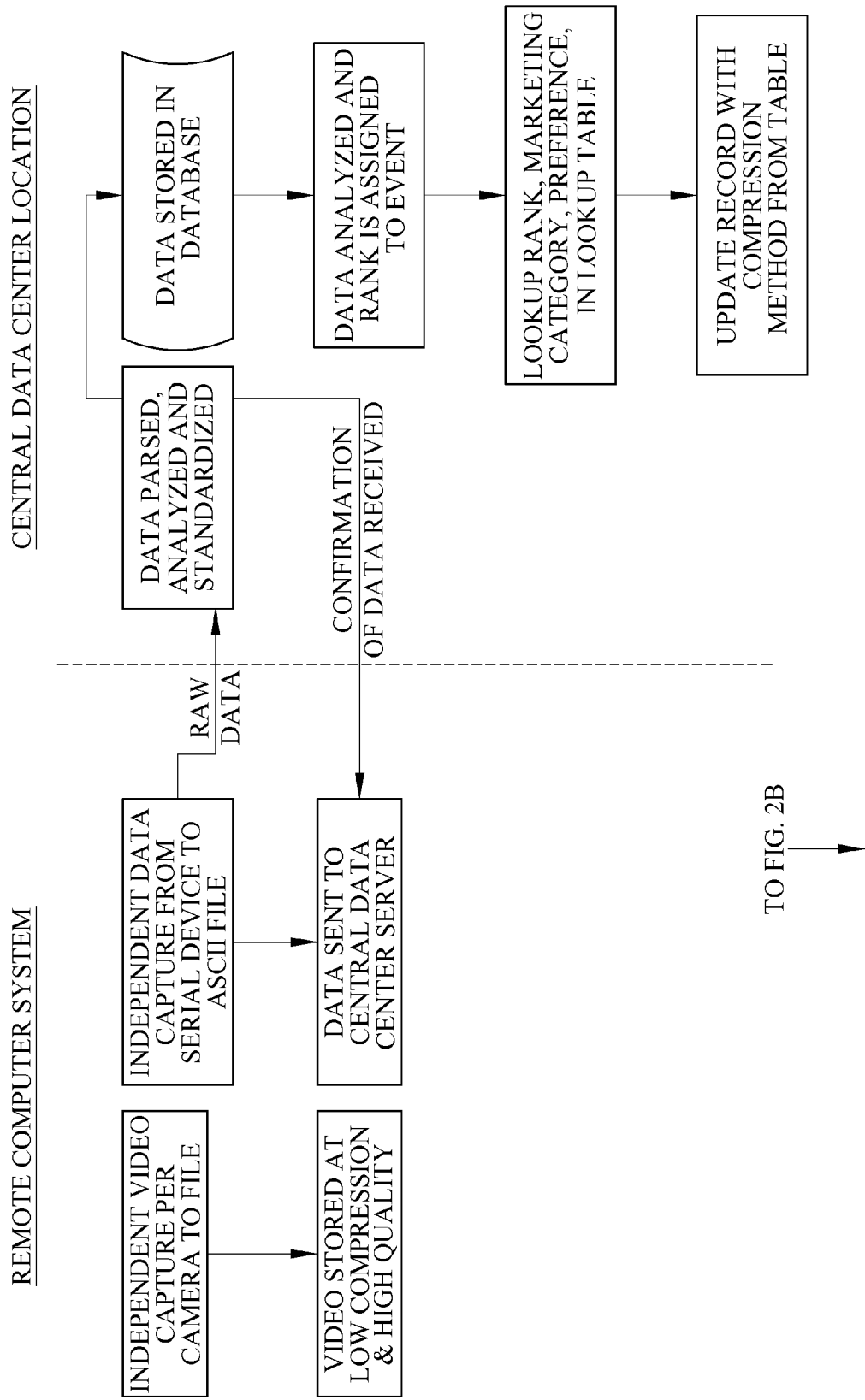
FIGS. 2A and 2B depict a flow chart for the method of the present invention.
Figure 2B:
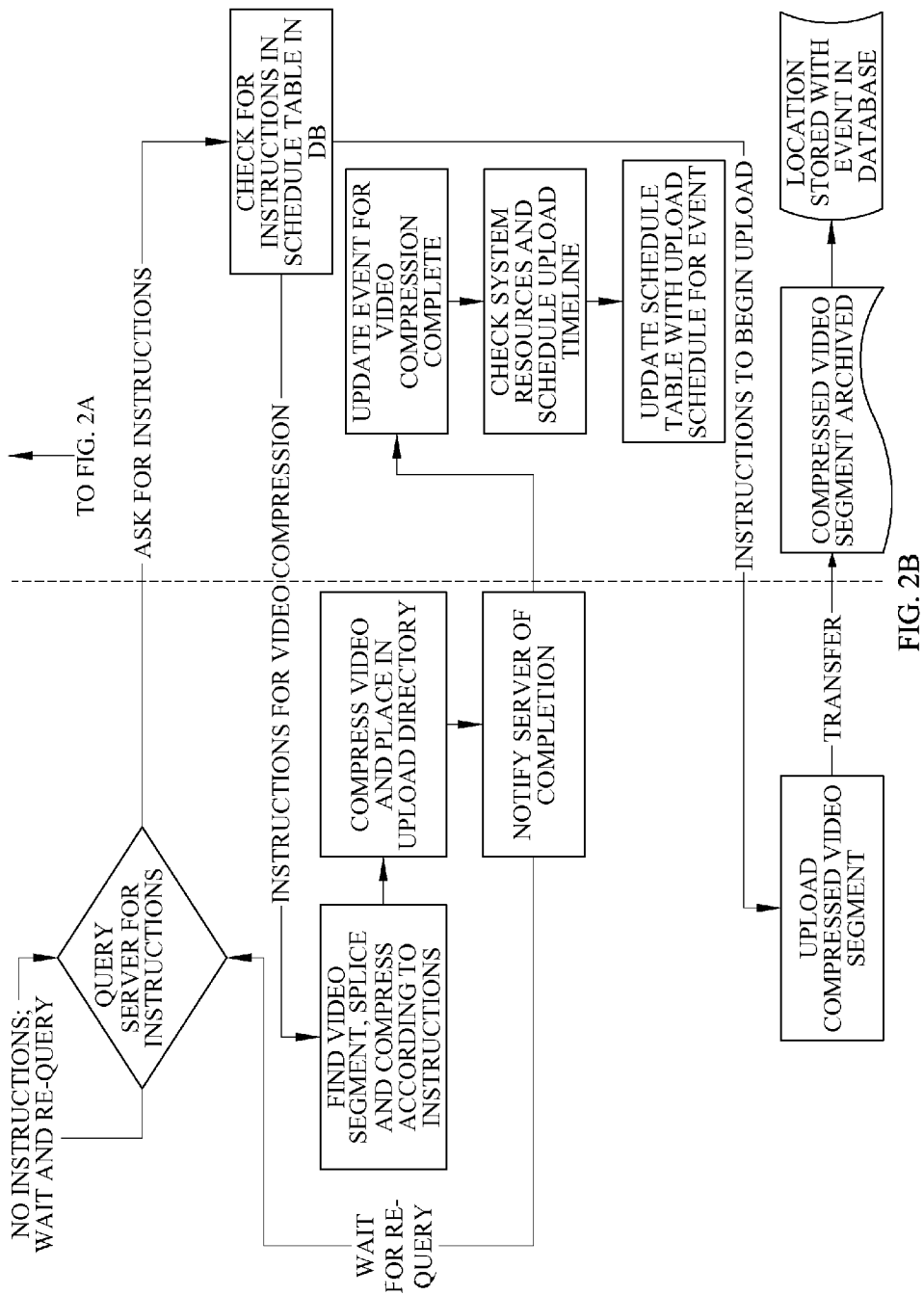
Figure 3B:
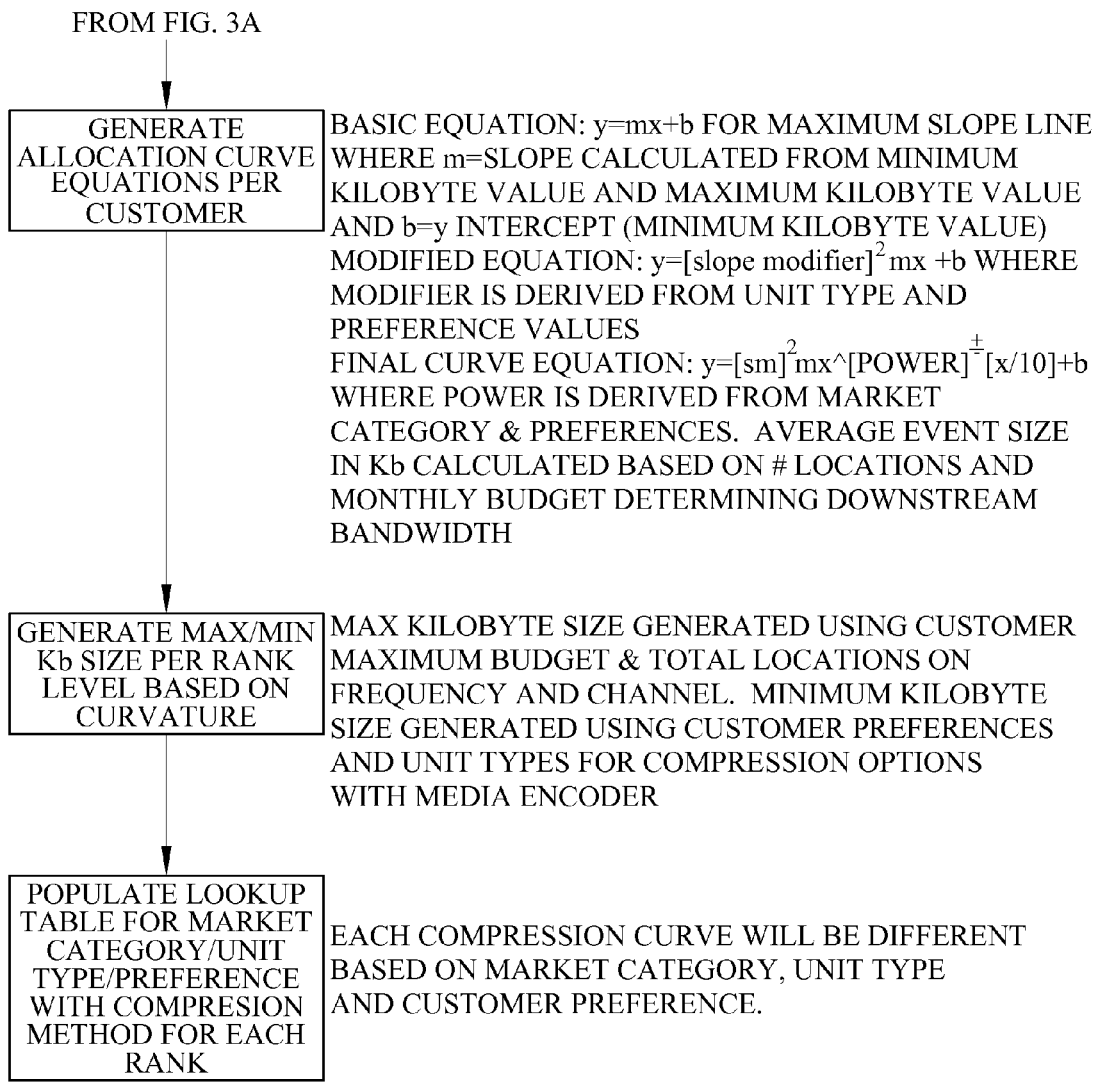

Referring initially to FIGS. 1-3, a system 10 is shown for a customer having at least one node. The system 10 comprises several components at both the customer's node represented on the left and the central data center represented on the right. Located at the customer's monitoring location, such as a fast-food restaurant, retail store, or for instance quick-mart, is at least one computer 12. By computer it is not meant to describe the device in a limited fashion but is descriptive of any electronic device capable of capturing electronic data.

The computer 12 may have a first communication port 14, such as a PCI card, connected to a motherboard within the computer 12 for receiving a video signal or other digital datastream from at least one digital camera 16. Digital video or other data captured from the camera 16 is stored on a hard disk on the computer 12 in timed increments, for example each minute or in two minute increments. The at least one digital camera 16 may be positioned at various locations within a monitoring node or site and each of the at least one cameras 16 is associated with an electronic device 20 such as a cash register, other point-of-sale device like a credit card or debit card reader, or at a building access way such as an entrance or exit door. Also located within the computer 12 and connected to the motherboard is a second communication port 18, for example a serial port. The serial port 18 is in communication with the at least one electronic device 20 sending data to the computer 12 during each transaction or event activating the electronic device 20. The computer segregates the data from each of the at least one electronic devices 20, for instance the data may be separated according to which terminal or point-of-sale device from which it is gathered.

As previously stated, each electronic device 20 is associated with at least one digital camera 16 or other device so that each event or transaction is recorded by the at least one camera 16. However the video data and data from the electronic device 20 may be separated according to one embodiment in order to increase efficiency of transfer and ability to access video and data files separately if needed. The computer 12 further includes an Ethernet connection 22 in communication with to a satellite dish 24. The satellite dish 24 provides communication point access to the customer's monitoring location and therefore provides communication between a central data center and the customer's monitoring location. In other words the system 10 provides for video or other digital data monitoring of associated electronic devices at a place of business and for communication of the data acquired by the electronic device during monitoring among other functionality.

A satellite 26 provides communication between the customer's monitoring location and a central data center 30 by way of a satellite transmitter 32 at the center 30. The central data center 30 also comprises a central data server 34 having a data warehouse or database 36 therein. However, the database 36 may be stored in a separate location in communication with the server 34 if necessary.

As the at least one electronic device 20 records data from for example retail transactions, various events may trigger the tagging of the video recording the incident or event occurring at the electronic device 20 or may even be the actual recorded event. Thus the system 10 may generally record or only record these events that have triggered significance. For purpose of the present invention, the term 'tagging' refers to video which is to be reviewed when certain data patterns or occurrence are deemed to require review of an event or transaction. For example, if an employee makes a "no cash sale" thereby providing access to the cash drawer during a low customer traffic time period, such an occurrence may trigger the tagging of the video for review. Various events or combination of events may trigger the tagging of an electronic device 20 and the video of the occurrences or actual recordation thereof.

The video and other data will be streamed directly to the local device 12 for temporary storage and subsequent transmission to the central data server 34. Additionally, real time data may be streamed directly to the central data server 34 for later analysis in order to determine which video segment must be retrieved.

Artificial Intelligence Model

The central data server 34 provides an artificial intelligence model and method for tracking and predicting potentially costly behavior patterns by including the centralized data warehouse 36. The artificial intelligence model creates behavioral algorithms by which future events can be "plugged in" to the equations and recommendations made for tagging video events or other digital data. In other words, events may be input and the algorithms continually updated so that the system is continually learning when to tag video for review.

Referring still to FIGS. 1-3, as raw data is captured from the electronic device 20 by computer 12 at the node site, video associated with the data is also stored on the computer 12 at the monitoring location or node site. The raw data may be continually streamed via satellite to the central data server 34 or may be transmitted at pre-selected intervals or times to the central data server 34 and placed in a data warehouse 36. In addition, the video associated with the data is saved in a high-quality format locally which may be compressed later or discarded.

When the raw data from the electronic devices representing transactions or other activity is received at the central data warehouse 36, it is parsed, analyzed, and standardized in two processes. One reason the data is standardized at the data center is that, for example, differing electronic devices 20 may have varying names for the same function. For example, a sales total figure may be called "Sales TTL," "Total," or Total Sale," by the point-of-sale equipment but may be the same function or parameter.

Figure 4:
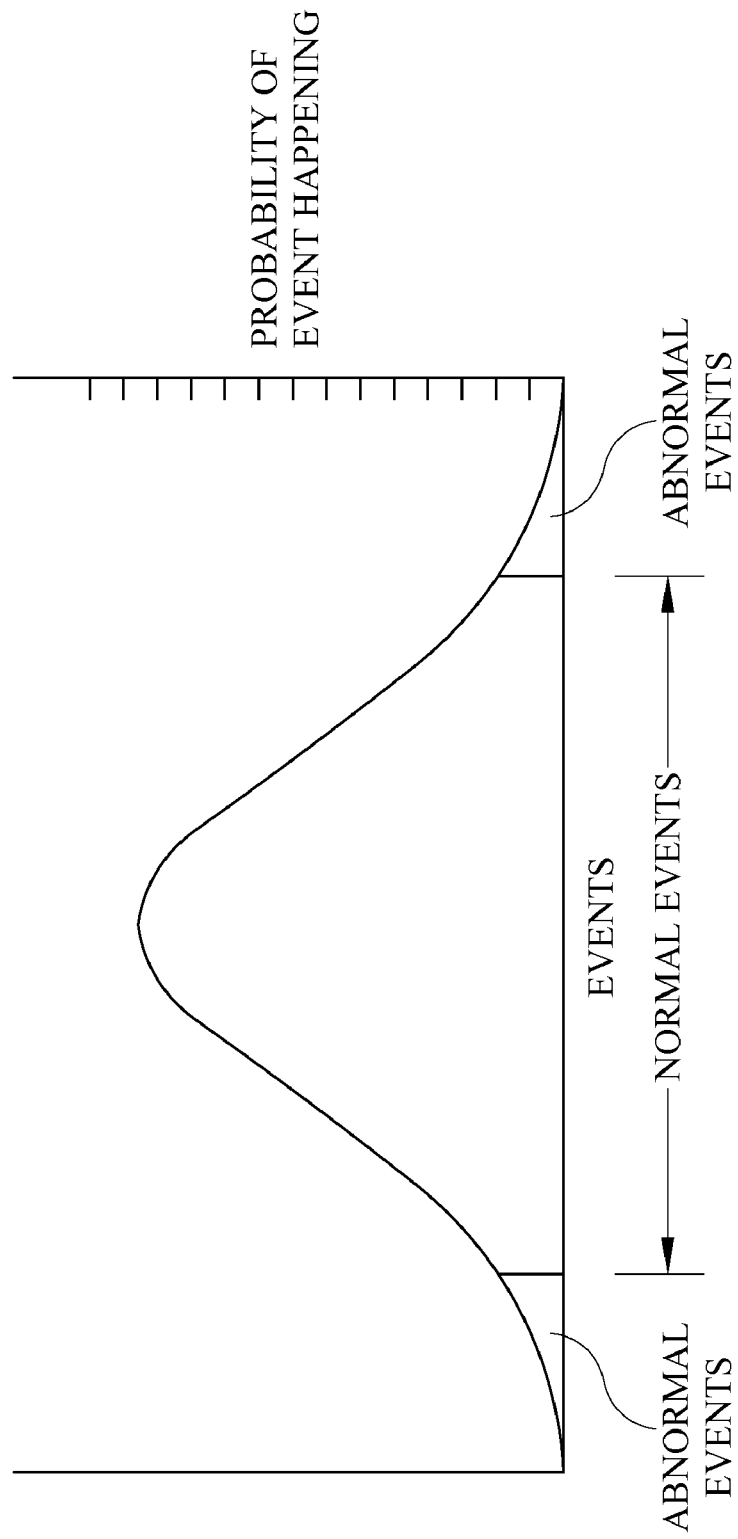
FIG. 4 depicts a distribution graph comparing probability and abnormality of an event.

According to the two step process, first the data is analyzed using a normal distribution model and second the data is analyzed using a linear regression model. Referring to FIG. 4, a distribution graph is shown having events along a first horizontal axis compared to the probability of the event happening along a second vertical axis. Stated otherwise, the curve represents the probability of each type of event occurring, given historical trends or user defined conditions. From this analysis the central data server 34 may determine if data representing events values fall inside normal ranges. The historical data is summarized at regular intervals in order to continually determine a normal distribution curve.

In order to categorize the historical data, first the raw data is categorized in a macro category. Next, the data is categorized in a sub-category. For example, one macro category may be a sale and sub-categories of that macro category may be a non-cash sale, for example by credit card, or a cash sale. Each macro category falls into a percentile and then each sub-category would fall into a percentile of the macro. After the events are categorized, the central data server 34 can determine whether the event falls outside the normal distribution, as shown in FIG. 4. The normal distribution may be determined by customer preferences and key inputs so that the ranges for normal and abnormal events are pre-selected by a user.

Figures 5, 6, 7, 8:
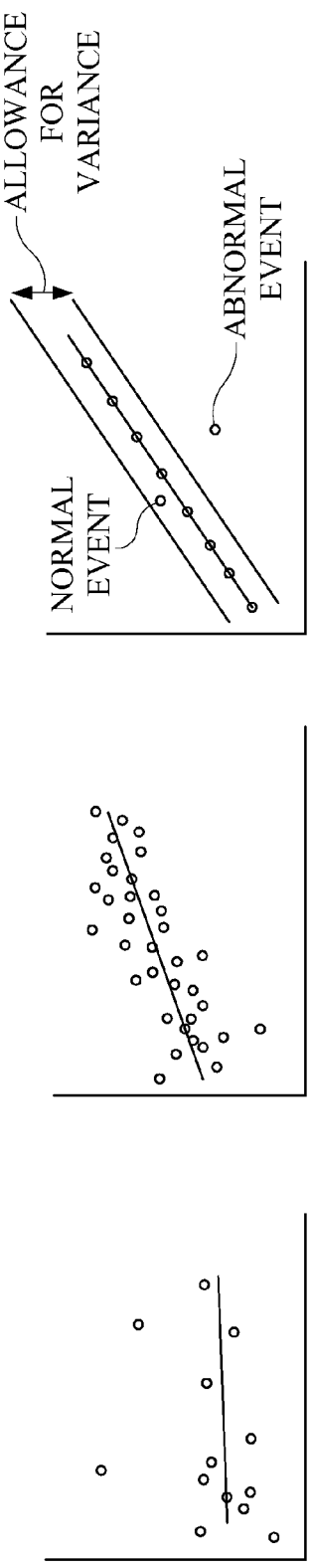
FIG. 5 depicts a linear regression model.
FIG. 6 depicts the linear regression model of FIG. 5 having increased data population.
FIG. 7 depicts a linear regression model of FIG. 6 having elasticity bounds related to the normality of an event.
FIG. 8 depicts an exemplary look-up table where the required size, in kilobytes, is given for a particular ranking assuming a certain preference of the customer.

Referring now to FIGS. 5-7, the second analysis process performed by the central data server 34 is a linear regression model. This second process is utilized to determine if an event is part of a pattern. Stated otherwise the linear regression takes an event in context of other events. The data warehouse 36 summarizes the data regularly to determine whether certain characteristics are "linear" For example, a sale is always followed by a cash drawer opening, and then followed by the cash drawer closing within, for instance, twenty-five (25) seconds. As shown in progression through FIGS. 5-7, as additional data is added to the population, the patterns become more evident. As events, represented by raw data from the electronic devices 20, are passed into the linear regression model, every regression equation that uses the type of event being analyzed is loaded and the event data is "plugged" into the equation. If the event falls statistically outside the linear model, it may be deemed as an abnormal event, as seen in FIG. 7. The customer may determine the amount of elasticity of their model with input preferences and thereby select an amount or allowance for variance.

After each event is analyzed by both processes, the resultant data is converted into percentile ranking and each percentile associated given a criticality or importance ranking. The criticality ranking is based on a scale of zero through nine (0-9), zero (0) being least critical, nine (9) being most critical. For purpose of the instant invention, ranking means higher ranked events are perceived as having a higher probability that an event is unusual as defined in the statistical process. The ranking is determined from, for example, a lookup table and the criticality ranking is then plugged into the event resource allocation management model. An exemplary lookup table is shown in FIG. 8 where the required file size is given, in kilobytes, for a particular ranking assuming a certain preference of the customer. Once the required file size is known, the appropriate compression method may be obtained from Table I. Thus, for more critical events, the file size will be larger so that the associated raw data for the event can be clearly reviewed. Further, less critical events can be further compressed thus resulting in a decreased image or data quality.

The software routines lookup the compression technique from the look up table which is continually re-calculated at predefined intervals. The table contains compression methods to use based on the ranking of event, type of electronic device monitored, market segment of the customer, and preferences of the customer, such as the preference for sharper image over file size. The lookup table is populated using algorithms which represent the curves for that customer. More specifically, the lookup table is populated by a routine that uses a statistical model equation for determining the curve of the customer, given various modifiers, for example video size needed based on ranking of the event. The curves are generated from combining all data captured and standardizing the event parameters so that commonality can be achieved and a statistical pattern derived. The curves are derived by looking at normal distribution for all standardized parameters using the probabilities of a parameter occurring, along with the analysis of the range of values for that parameter.

A standard linear equation is modified to form a curve connecting the minimal video size allowed to the maximum video size allowed. This curve allows higher ranked events to be transmitted at larger sizes and lower ranked events to be transmitted at smaller sizes while maintaining an average video segment size across all events uploaded. In effect, the curve minimizes the average video size that would be derived from a straight linear function.

The artificial intelligence model enables the system 10 to statistically learn behavior patterns and uses an event ranking system based on a combination of customer-defined criteria and statistical distribution percentages.

Event Resource Allocation Model

The central data server 34 also comprises an event resource allocation model which manages satellite bandwidth. As previously discussed, satellite based internet access is favorable since it is available in many remote locations where land line access is not yet available. In addition, downloading information from a satellite based Internet connection is relatively quick due to bandwidth availability. On the other hand, uploading information using a satellite-based internet access is quite slow due to bandwidth limitations. Due to these limitations, transmission of monitoring video from customer nodes to a central data center 30 via satellite may be severely limited. The event resource allocation model of the present invention manages the transmission from land based satellite dishes at the customer nodes to the orbiting satellites and on to the central data center 30.

The event resource allocation model effectively determines the amount of video that a customer will actually need transmitted at any given time. This reduces the amount of video needing to be sent from the customer node to the central data center 30. In other words, some amount of video less than the entire amount need only be sent from the node or monitoring location to the central data center 30.

Figure 9:
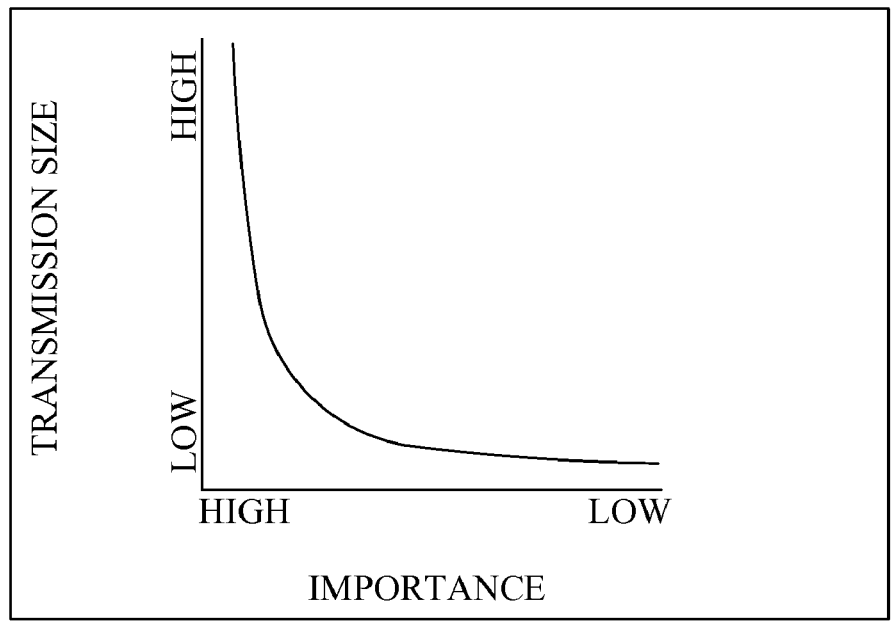
FIG. 9 depicts a chart comparing data transmission size and event importance; and, FIG. 10 depicts a chart comparing event importance and probability of an event occurring.

As video is captured in timed segments by the cameras 16 at the customer node, video segments are saved on the computer 12. The segments are ranked according to importance or criticality by the artificial intelligence model using the data from electronic devices 20 associated with the video. An exemplary event allocation graph is shown in FIG. 9 having event importance along one axis and corresponding transmission size along the second axis. As shown in the graph, as the importance or criticality of an event increases, the transmission size of the file also increases. In other words, important events consist of more video at higher quality while less important events consist of less video at lower quality.

The event resource allocation model determines an appropriate event allocation curve for each customer node or monitoring location. Each event allocation curve is developed by first creating a list of possible compression methods for any given video segment. For example, a list is created having various compression methods and the corresponding resultant file size, in kilobytes, for each method of compression. An exemplary table is shown labeled herein as Table I. Based on these inputs, an average event size is computed representing the amount of data sent on average that may be utilized given the customer's budget.

TABLE I

| Compression Method | Size (kb) |
|---|---|
| 1 | 5 |
| 2 | 10 |
| 3 | 15 |
| 4 | 20 |
| 5 | 25 |

The event resource allocation model then determines an aggregate bandwidth that then may be used based on data such as number of locations, number of transactions per month, and the monthly budget of the customer.

Figure 10:
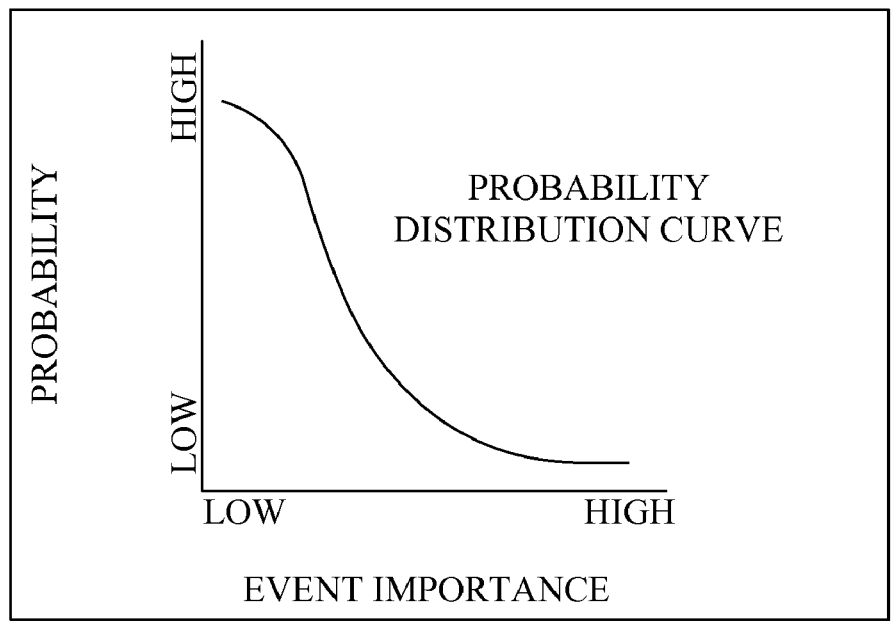

Next the event resource allocation model computes a weighted average size for each event based on a probability distribution curve, shown in FIG. 10. The probability distribution curve is derived from historical data which illustrates the relative probability of each type of event and customer preferences. As shown in the FIG. 10, higher probability events may be of lower importance while lower probability events may be of higher importance. The weighted averages are then statistically minimized to achieve the probable event size that will be less than or equal to the average event size in order to stay within a customer's budget for bandwidth use.

According to one exemplary embodiment, multiple curves may be generated stressing various preferences over others, such as preference of video quality over video duration or video smoothness over video crispness. In any event, the curve may be one that most closely matches the client's preferences, which may vary by location or node. When video is captured at the site at the highest quality and duration possible, the event resource allocation model may determine the compression curve required for the event.

Once a compression routine is determined, the information is sent to a scheduling table within the data server 34. The scheduling table contains all of the video compression requirements for computers on the network at any given time. The scheduling table is continually updated to include times and dates for uploading compressed video from, for example, computer 12. The software at the server determines the schedule based on currently occurring file uploads and the amount of data being uploaded. Each schedule record in the table is marked so that the record is queued at the appropriate time when bandwidth is optimal.

Each computer 12 on the network regularly polls the central data server 34 to query whether a file needs to be uploaded. The central data server 34 scans the scheduling table and informs the computer 12 to compress the desired video segment, parse it, if necessary, and then query again to be given instruction to upload the video. This process allows the central data center to manage the video uploads that would normally cause large amounts of collisions when systems attempt to upload on their own without the aid of a centralized managing process. The end result is a system 10 intelligently and adaptively transmitting video that is useful to a customer rather than transmitting all of the captured video and violating a price-point of the user.

After the video is uploaded from the node to the central data server 34, the video may be viewed at the central data center 30 or may be remotely accessed from the internet or other network by a user.

The foregoing detailed description is given primarily for clearness of understanding and no unnecessary limitations are to be understood therefrom for modifications will become obvious those skilled in the art upon reading this disclosure and may be made without departing from the spirit of the invention and scope of the appended claims.

We claim:

1. A method of scheduling and usage of bandwidth comprising the steps of:
   a. capturing digital video and storing said video on a computer;
   b. capturing digital data associated with said digital video;
   c. transmitting said digital data associated with said digital video to a central data server:
   d. developing at least one compression curve for a customer;
   e. instructing said computer how to compress said digital video;
   f. transmitting said digital video; and, creating a list of possible compression methods.

2. A method of scheduling and usage of bandwidth comprising the steps of:
   a. capturing digital video and storing said video on a computer;
   b. capturing digital data associated with said digital video;
   c. transmitting said digital data associated with said digital video to a central data server:
   d. developing at least one compression curve for a customer;
   e. instructing said computer how to compress said digital video;
   f. transmitting said digital video; and determining the amount of bandwidth a customer can use.

3. A method of scheduling and usage of bandwidth comprising the steps of:
   a. capturing digital video and storing said video on a computer;
   b. capturing digital data associated with said digital video;
   c. transmitting said digital data associated with said digital video to a central data server:
   d. developing at least one compression curve for a customer;
   e. instructing said computer how to compress said digital video;
   f. transmitting said digital video; and, computing an average event size based on a customer budget.

4. A method of scheduling and usage of bandwidth comprising the steps of:
   a. capturing digital video and storing said video on a computer;
   b. capturing digital data associated with said digital video;
   c. transmitting said digital data associated with said digital video to a central data server;
   d. developing at least one compression curve for a customer;
   e. instructing said computer how to compress said digital video;
   f. transmitting said digital video; and, computing a weighted average event size based on a probability distribution curve.

5. The method of claim 4, computing said weighted average event size based on historical data.

6. The method of claim 5, computing said weighted average event size by determining probability of probable event size being less than or equal to an average event size.

7. The A method of scheduling and usage of bandwidth comprising the steps of:
   a. capturing digital video and storing said video on a computer;
   b. capturing digital data associated with said digital video;
   c. transmitting said digital data associated with said digital video to a central data server:
   d. developing at least one compression curve for a customer;
   e. instructing said computer how to compress said digital video;
   f. transmitting said digital video; and, generating multiple compression curves depending on said customer's market segment.

8. A method of scheduling and usage of bandwidth comprising the steps of:
   a. capturing digital video and storing said video on a computer;
   b. capturing digital data associated with said digital video;
   c. transmitting said digital data associated with said digital video to a central data server;
   d. developing at least one compression curve for a customer;
   e. instructing said computer how to compress said digital video;
   f. transmitting said digital video; and, defining a look up table.

9. The method of claim 8, redefining said look up table at pre-selected intervals.

10. The method of claim 8, further comprising the step of determining a compression method in a look up table based on ranking of an event.

11. The method of claim 10, further comprising the step of determining a compression method based on type of unit monitored.

12. The method of claim 11, further comprising the step of determining a compression method based on market segment.

13. The method of claim 12, further comprising the step of determining a compression method based on customer preference.

14. The method of claim 12, further comprising the step of forming a compression curve connecting minimal video size to maximum video size using a standard linear equation.

15. A method of scheduling and usage of bandwidth comprising the steps of:
  a. capturing digital video and storing said video on a computer;
  b. capturing digital data associated with said digital video;
  c. transmitting said digital data associated with said digital video to a central data server:
  d. developing at least one compression curve for a customer;
  e. instructing said computer how to compress said digital video;
  f. transmitting said digital video; and, storing each of said captured videos for a preselected time.

16. A method of scheduling and usage of bandwidth comprising the steps of:
  a. capturing digital video and storing said video on a computer;
  b. capturing digital data associated with said digital video;
  c. transmitting said digital data associated with said digital video to a central data server:
  d. developing at least one compression curve for a customer;
  e. instructing said computer how to compress said digital video;
  f. transmitting said digital video; and, storing each captured video in a separate file.

17. A method of scheduling and usage of bandwidth comprising the steps of:
  a. capturing digital video and storing said video on a computer;
  b. capturing digital data associated with said digital video;
  c. transmitting said digital data associated with said digital video to a central data server:
  d. developing at least one compression curve for a customer;
  e. instructing said computer how to compress said digital video;
  f. transmitting said digital video; and, capturing said data in a raw format and storing said data on a hard drive.

18. The method of claim 17, storing said data in ASCII format.

19. The method of claim 17, uploading said data at regular intervals to said central data center.

20. The method of claim 17, uploading said data immediately to said central data center.

21. A method of scheduling and usage of bandwidth comprising the steps of:
  a. capturing digital video and storing said video on a computer;
  b. capturing digital data associated with said digital video;
  c. transmitting said digital data associated with said digital video to a central data server:
  d. developing at least one compression curve for a customer;
  e. instructing said computer how to compress said digital video;
  f. transmitting said digital video; and, said central data server receiving said digital data.

22. The method of claim 21, said central data center statistically ranking said data.

23. A method of scheduling and usage of bandwidth comprising the steps of:
  a. capturing digital video and storing said video on a computer;
  b. capturing digital data associated with said digital video;
  c. transmitting said digital data associated with said digital video to a central data server:
  d. developing at least one compression curve for a customer;
  e. instructing said computer how to compress said digital video;
  f. transmitting said digital video; and, instructing said computer on a method of video compression.

24. A method of scheduling and usage of bandwidth comprising the steps of:
  a. capturing digital video and storing said video on a computer;
  b. capturing digital data associated with said digital video;
  c. transmitting said digital data associated with said digital video to a central data server:
  d. developing at least one compression curve for a customer;
  e. instructing said computer how to compress said digital video;
  f. transmitting said digital video; and, inserting information into a scheduling table on the central data server.

25. The method of claim 24 said scheduling table holding all requirements for said video compression.

26. The method of claim 24, said table continually updating dates and times for uploading said compressed video.

27. The method of claim 24, a user's computer continually polling said central data server to determine if uploading necessary.

28. The method of claim 24, said central data server managing video uploads and inhibiting collisions.

29. A method for scheduling and usage of satellite bandwidth, comprising the steps of:
  a. continuously deriving an artificial intelligence model for ranking data captured by electronic devices;
  b. continuously deriving an event resource allocation model for determining compression routines and managing transmission of compressed video from a remote site to a central data center;
  c. capturing said data from an electronic device at a remote site;
  d. capturing video associated with said data at said remote site; and, storing said captured video on a computer at said remote site.

30. A method for scheduling and usage of satellite bandwidth, comprising the steps of:
  a. continuously deriving an artificial intelligence model for ranking data captured by electronic devices;
  b. continuously deriving an event resource allocation model for determining compression routines and managing transmission of compressed video from a remote site to a central data center;
  c. capturing said data from an electronic device at a remote site;

d. capturing video associated with said data at said remote site; and, said data continuously transmitted to said central data center.

31. The method of claim 30, said artificial intelligence model reviewing said data and statistically ranking an event represented by said data.

32. A method for scheduling and usage of satellite bandwidth, comprising the steps of:
   a. continuously deriving an artificial intelligence model for ranking data captured by electronic devices;
   b. continuously deriving an event resource allocation model for determining compression routines and managing transmission of compressed video from a remote site to a central data center;
   c. capturing said data from an electronic device at a remote site;
   d. capturing video associated with said data at said remote site; and, said artificial intelligence model utilizing a two step analysis.

33. The method of claim 32, analyzing said data using a normal distribution model.

34. The method of claim 33, analyzing said data using a linear regression model.

35. The method of claim 34, said data ranked according to criticality of the event.

36. A method for scheduling and usage of satellite bandwidth, comprising the steps of:
   a. continuously deriving an artificial intelligence model for ranking data captured by electronic devices;
   b. continuously deriving an event resource allocation model for determining compression routines and managing transmission of compressed video from a remote site to a central data center;
   c. capturing said data from an electronic device at a remote site;
   d. capturing video associated with said data at said remote site; and, including a central data server defining a lookup table.

37. The method of claim 36, populating said lookup table using at least one algorithm including various pre-selected modifiers.

38. A method for scheduling and usage of satellite bandwidth, comprising the steps of:
   a. continuously deriving an artificial intelligence model for ranking data captured by electronic devices;
   b. continuously deriving an event resource allocation model for determining compression routines and managing transmission of compressed video from a remote site to a central data center;
   c. capturing said data from an electronic device at a remote site;
   d. capturing video associated with said data at said remote site; and, said event resource allocation model managing transmission from a land based satellite dish at said remote site to orbiting satellites and on to said central data center.

39. A method for scheduling and usage of satellite bandwidth, comprising the steps of:
   a. continuously deriving an artificial intelligence model for ranking data captured by electronic devices;
   b. continuously deriving an event resource allocation model for determining compression routines and managing transmission of compressed video from a remote site to a central data center;
   c. capturing said data from an electronic device at a remote site;
   d. capturing video associated with said data at said remote site; and, said event resource allocation model managing deriving a compression curve for appropriate video compression.

40. The method of claim 39, said event resource allocation model statistically minimizing weighted averages to achieve a probable event size less than or equal to an average event size.

41. A method for scheduling and usage of satellite bandwidth, comprising the steps of:
   a. continuously deriving an artificial intelligence model for ranking data captured by electronic devices;
   b. continuously deriving an event resource allocation model for determining compression routines and managing transmission of compressed video from a remote site to a central data center;
   c. capturing said data from an electronic device at a remote site;
   d. capturing video associated with said data at said remote site; and, said event resource allocation model utilizing a scheduling table having compression information therein.

42. The method of claim 41, continuously updating said scheduling table.

43. The method of claim 41, a computer polling said scheduling table and query instruction on compression and transmission of said captured video.

44. A method for scheduling and usage of satellite bandwidth, comprising:
   a. capturing data from an electronic device;
   b. capturing video associated with said electronic device;
   c. transmitting said data to a central data server;
   d. said central data server analyzing said data and ranking event represented by said data;
   e. said central data server instructing a computer to compress pre-selected video;
   f. said computer transmitting said video to said central data server; and utilizing an artificial intelligence model to rank said event.

45. The method of claim 44, said artificial intelligence model utilizing a normal distribution model.

46. The method of claim 45, said artificial intelligence model utilizing a linear regression model.

47. A method for scheduling and usage of satellite bandwidth, comprising:
   a. capturing data from an electronic device;
   b. capturing video associated with said electronic device;
   c. transmitting said data to a central data server;
   d. said central data server analyzing said data and ranking event represented by said data;
   e. said central data server instructing a computer to compress pre-selected video;
   f. said computer transmitting said video to said central data server; and said central data server utilizing an event resource allocation model.

48. The method of claim 47, said event resource allocation model determining an appropriate compression method.

49. The method of claim 47, said event resource allocation model instructing said computer how to compress said captured video and when to transmit said captured video.

* * * * *